United States Patent
Moner et al.

(10) Patent No.: US 11,485,046 B2
(45) Date of Patent: Nov. 1, 2022

(54) TWINHAMMER NOZZLE WEDGE

(71) Applicant: Parker-Hannifin Corporation, Cleveland, OH (US)

(72) Inventors: Ronald A. Moner, Twinsburg, OH (US); Alex M. James, Aurora, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 655 days.

(21) Appl. No.: 16/406,430

(22) Filed: May 8, 2019

(65) Prior Publication Data

US 2019/0344476 A1 Nov. 14, 2019

Related U.S. Application Data

(60) Provisional application No. 62/669,564, filed on May 10, 2018.

(51) Int. Cl.
*B23Q 11/00* (2006.01)
*B28D 7/02* (2006.01)
*B05B 15/60* (2018.01)

(52) U.S. Cl.
CPC ............... *B28D 7/02* (2013.01); *B05B 15/60* (2018.02); *B23Q 11/00* (2013.01); *B23Q 11/0042* (2013.01); *B23Q 11/0071* (2013.01)

(58) Field of Classification Search
CPC ... B23Q 11/00; B23Q 11/0042; B23Q 11/005; B23Q 11/0071
USPC ........................................................ 173/199
See application file for complete search history.

(56) References Cited

U.S. PATENT DOCUMENTS

| | | | |
|---|---|---|---|
| 4,815,660 A | 3/1989 | Boger | |
| 5,762,691 A * | 6/1998 | Gondar | B23Q 11/0046 96/60 |
| 5,944,263 A * | 8/1999 | Lucco | B05B 15/654 239/289 |
| 10,753,720 B2 * | 8/2020 | Schultz | G01B 5/14 |
| 2011/0008117 A1* | 1/2011 | Kasuya | B25D 17/088 408/67 |
| 2011/0185869 A1* | 8/2011 | Wasielewski | B25F 5/02 83/100 |
| 2016/0136799 A1* | 5/2016 | Morissette | B25D 17/20 280/47.3 |

FOREIGN PATENT DOCUMENTS

| | | |
|---|---|---|
| DE | 4020773 A1 | 1/1992 |
| DE | 4208973 A1 | 7/1993 |

* cited by examiner

*Primary Examiner* — Chelsea E Stinson
(74) *Attorney, Agent, or Firm* — Renner, Otto, Boisselle & Sklar, LLP

(57) ABSTRACT

A spray dust compression system and method includes a nozzle holder for affixing a spray nozzle to a percussive tool. The nozzle holder includes an arcuate wall having a first surface engageable with the percussive tool, and a second surface opposing the first surface. A protruding body protrudes radially outwardly from the second surface relative to a longitudinal axis of the arcuate wall and a concave recess is formed in the protruding body and receives the spray nozzle. The concave recess is angled inwardly toward the longitudinal axis of the arcuate wall.

16 Claims, 6 Drawing Sheets

TWINHAMMER NOZZLE WEDGE

RELATED APPLICATIONS

This application claims the benefit of U.S. Provisional Application No. 62/669,564 filed May 10, 2018, the entirety of which is hereby incorporated herein by reference.

FIELD OF INVENTION

The present invention relates to dust suppressors, and more particularly to liquid mist dust suppressors suitable for use with construction tools such as jack hammers.

BACKGROUND

Concrete and other hard surfaces may be drilled or cut using a percussive tool such as an air hammer or jack hammer. Water spray nozzles are affixed to the drilling device for spraying a dust suppressing mist onto the concrete. The dust suppressing mist reduces the amount of dust that is dispersed as a result of the drilling or cutting. The spray nozzles are generally configured to have a cone spray. However, conventional spray nozzles may be inefficient in suppressing the dust due to the nozzles being unable to accurately direct the cone spray at the precise area where the dust is generated.

SUMMARY OF INVENTION

The present invention is directed towards a nozzle holder that secures a spray nozzle to a percussive tool at a fixed angle. The nozzle holder has a pocket formed in the nozzle holder that retains the body of the spray nozzle and holds the spray nozzle at a predetermined angle relative to the longitudinal axis of the percussive tool. Thus, the spray pattern of the spray nozzle is positioned to continuously encapsulate the end of the tool bit of the percussive tool and reduce the airborne dust during use of the percussive tool.

According to an aspect of the invention, a nozzle holder for affixing a spray nozzle to a percussive tool includes an arcuate wall having a first surface engageable around the percussive tool and a second surface opposing the first surface, a protruding body that protrudes radially outwardly from the second surface relative to a longitudinal axis of the arcuate wall, and a concave recess that is formed in the protruding body and receives the spray nozzle, wherein the concave recess is angled inwardly toward the longitudinal axis of the arcuate wall.

According to another aspect of the invention, a spray dust suppression system for a percussive tool having a first longitudinal axis includes a nozzle holder body having an arcuate surface that engages around an exterior surface of the percussive tool and a pocket opposing the arcuate surface that receives a spray nozzle. The pocket is angled inwardly relative to a longitudinal axis of the arcuate surface. The spray dust suppression system includes at least one fastener that is configured to both maintain engagement between the nozzle holder body and the exterior surface of the percussive tool, and retain the spray nozzle within the pocket.

According to another aspect of the invention, a method of affixing a spray nozzle to a percussive tool includes engaging an arcuate surface of a nozzle holder against an exterior surface of the percussive tool, press-fitting a spray nozzle into a pocket of the nozzle holder, wherein a first longitudinal axis of the pocket is angled relative to a second longitudinal axis of the percussive tool, and using a fastener to secure the nozzle holder to the percussive tool and hold the spray nozzle in the pocket.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

DETAILED DESCRIPTION

Figure 1:
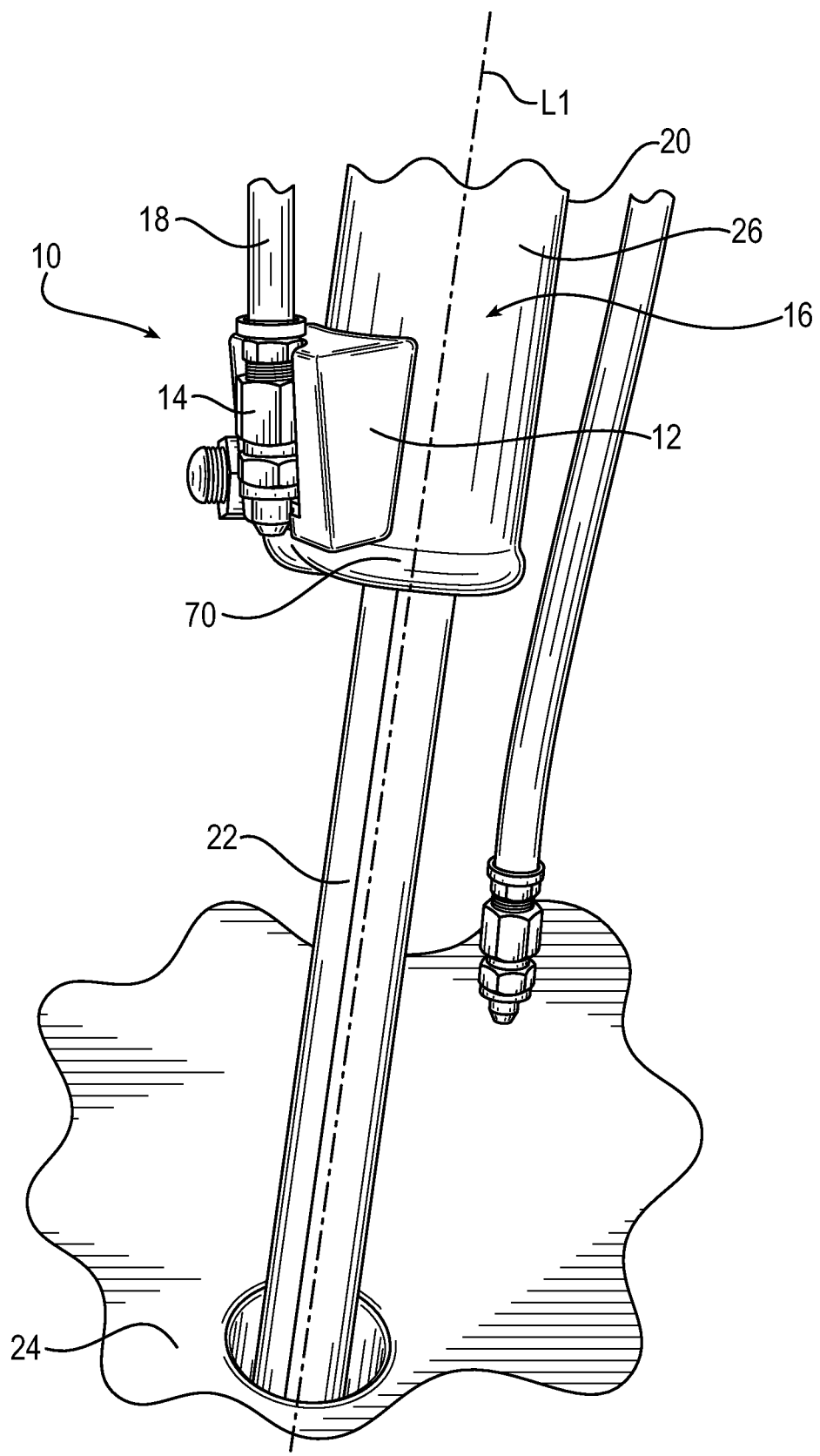
FIG. 1 is a schematic drawing of a spray dust suppression system according to an exemplary embodiment.

Aspects of the present invention relate to spray dust suppression systems suitable for use in various drilling and cutting applications that require percussive tools such as jack hammers. Referring to FIG. 1, a schematic drawing of a spray dust suppression system 10 is shown. The spray dust suppression system 10 includes a nozzle holder body 12 for affixing a spray nozzle 14 to a percussive tool 16. The spray nozzle 14 may include any suitable hose fitting arranged at the end of a tubular hose 18 that is configured to supply fluid to the spray nozzle 14 and out of the end of the spray nozzle 14. The spray dust suppression system 10 may include a hose valve (not shown) arranged at an opposite end of the hose 18 from the spray nozzle 14.

The percussive tool 16 may be a jack hammer having a main body 20 and a tool bit 22 protruding from the end of the main body 20 to drill through a surface 24. In exemplary applications, the surface 24 may be formed of concrete. The main body 20 of the percussive tool 16 is cylindrical, and the tool bit 22 extends along a longitudinal axis L1 of the main body 20. The nozzle holder body 12 has a contoured surface that engages around an exterior surface 26 of the main body 20 of the percussive tool 16, and a pocket formed in a surface that opposes the contoured surface. The pocket receives and retains at least a portion of the spray nozzle 14.

Referring in addition to FIGS. 2-5, the nozzle holder body 12 has an arcuate wall 28 that is arced toward the longitudinal axis L1 of the percussive tool 16 when the nozzle holder body 12 is arranged on the percussive tool 16. The arcuate wall 28 has a first surface 30 (shown in FIG. 2) and a second surface 32 (shown in FIG. 3) that opposes the first surface 30. The first surface 30 is engageable around the exterior surface 26 of the percussive tool 16. The radius of curvature of the arcuate wall 28 is slightly larger than the radius of curvature of the main body 20 of the percussive tool 16. The nozzle holder body 12 may be detachable and non-integrally formed with the percussive tool 16, as shown in FIG. 1. The detachable nozzle holder body 12 may be formed of any suitable material. Examples of suitable materials include a rubber polymer or thermoplastic. In other exemplary embodiments, the nozzle holder body 12 may be integrally formed with the percussive tool 16, or non-integrally formed and fixed to the percussive tool 16.

Figure 2:
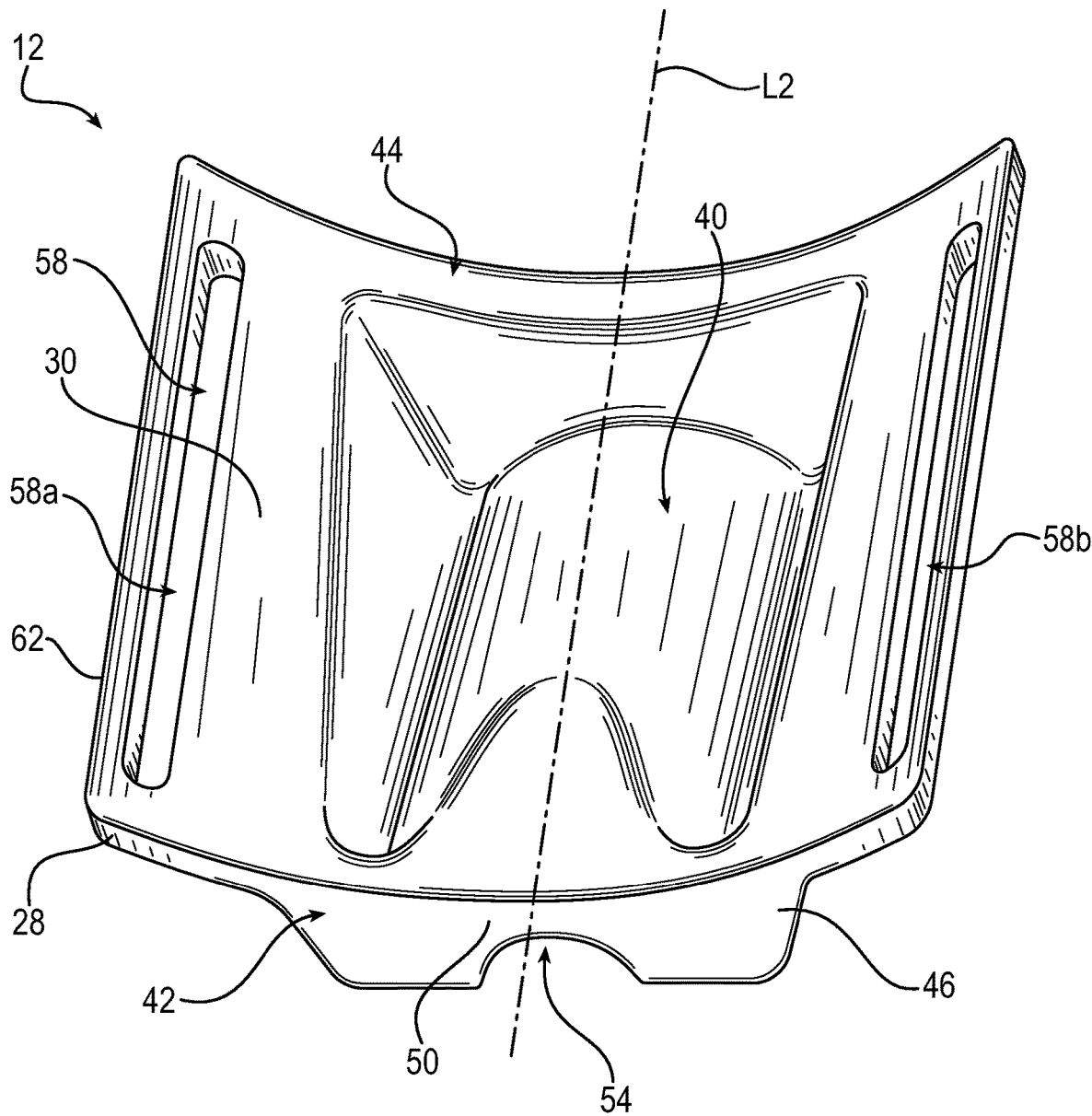
FIG. 2 is a schematic drawing showing an isometric view of a first side of a nozzle holder body of the spray dust suppression system shown in FIG. 1.

In the exemplary embodiment in which the nozzle holder body 12 is formed to be separable from the percussive tool 16, the arcuate wall 28 has a contour that is complementary to the exterior surface 26 of the main body 20 of the percussive tool 16 such that the first surface 30 of the arcuate wall 28 rests against the exterior surface 26 of the percussive tool 16. The nozzle holder body 12 is engageable around any suitable portion of the main body 20 of the percussive tool 16 where the radium of curvature of each component permits a largely matched fit. The portion against which the nozzle holder body 12 is engageable may be less than half of the circumference of the main body 20. As shown in FIG. 1, the nozzle holder body 12 is arranged at the end of the main body 20 that is proximate the tool bit 22 and the surface 24. The opposite end of the percussive tool 16 (not shown) is engaged by the user of the percussive tool 16. As shown in FIG. 2, the arcuate wall 28 may define a longitudinal axis L2. The longitudinal axis L2 is parallel to the longitudinal axis L1 of the percussive tool 16 when the holder body 12 is positioned against the main body 20.

Figure 3:
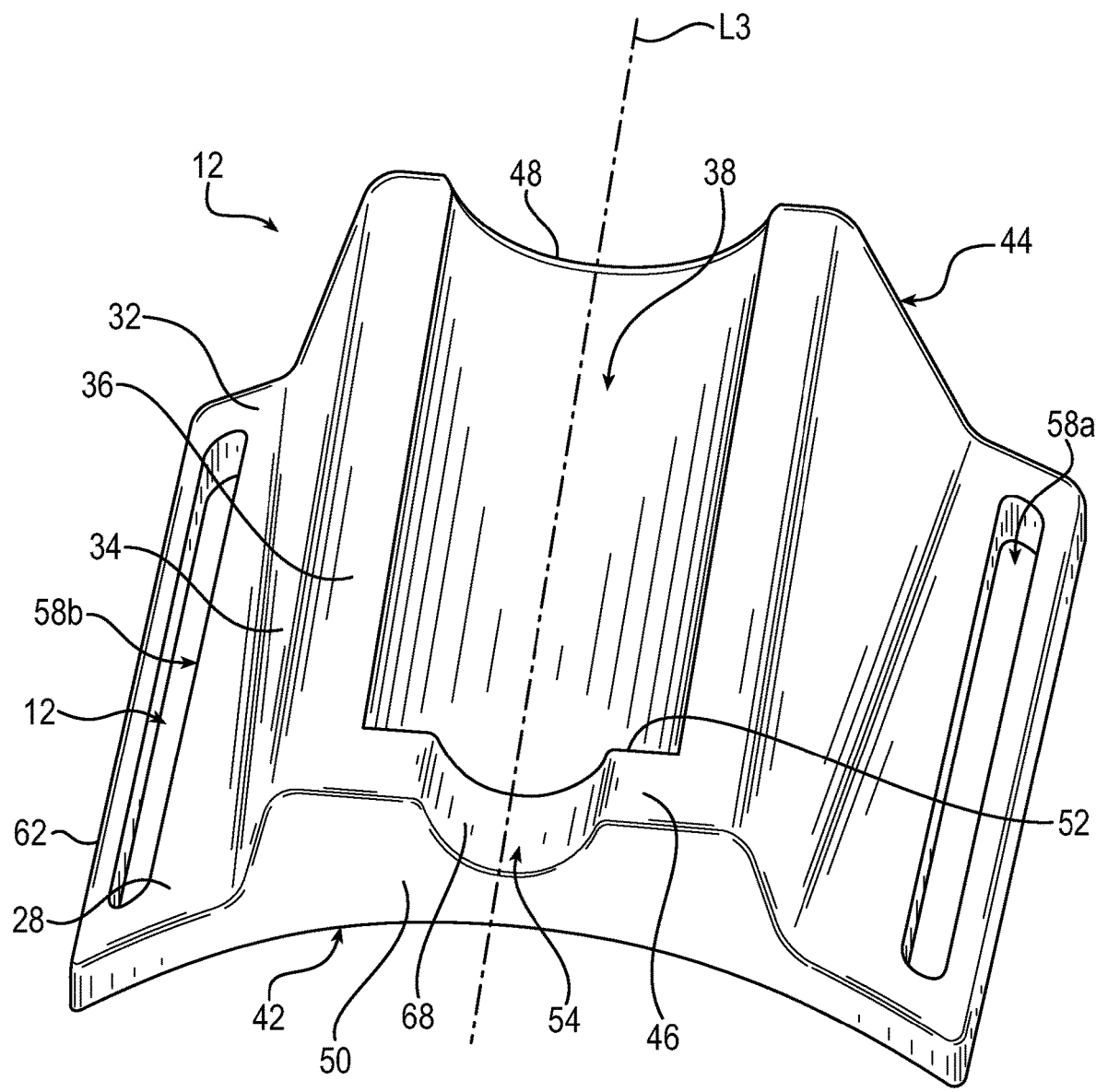
FIG. 3 is a schematic drawing showing an isometric view of a second side of the nozzle holder body of the spray dust suppression system shown in FIG. 1.
Figure 4:
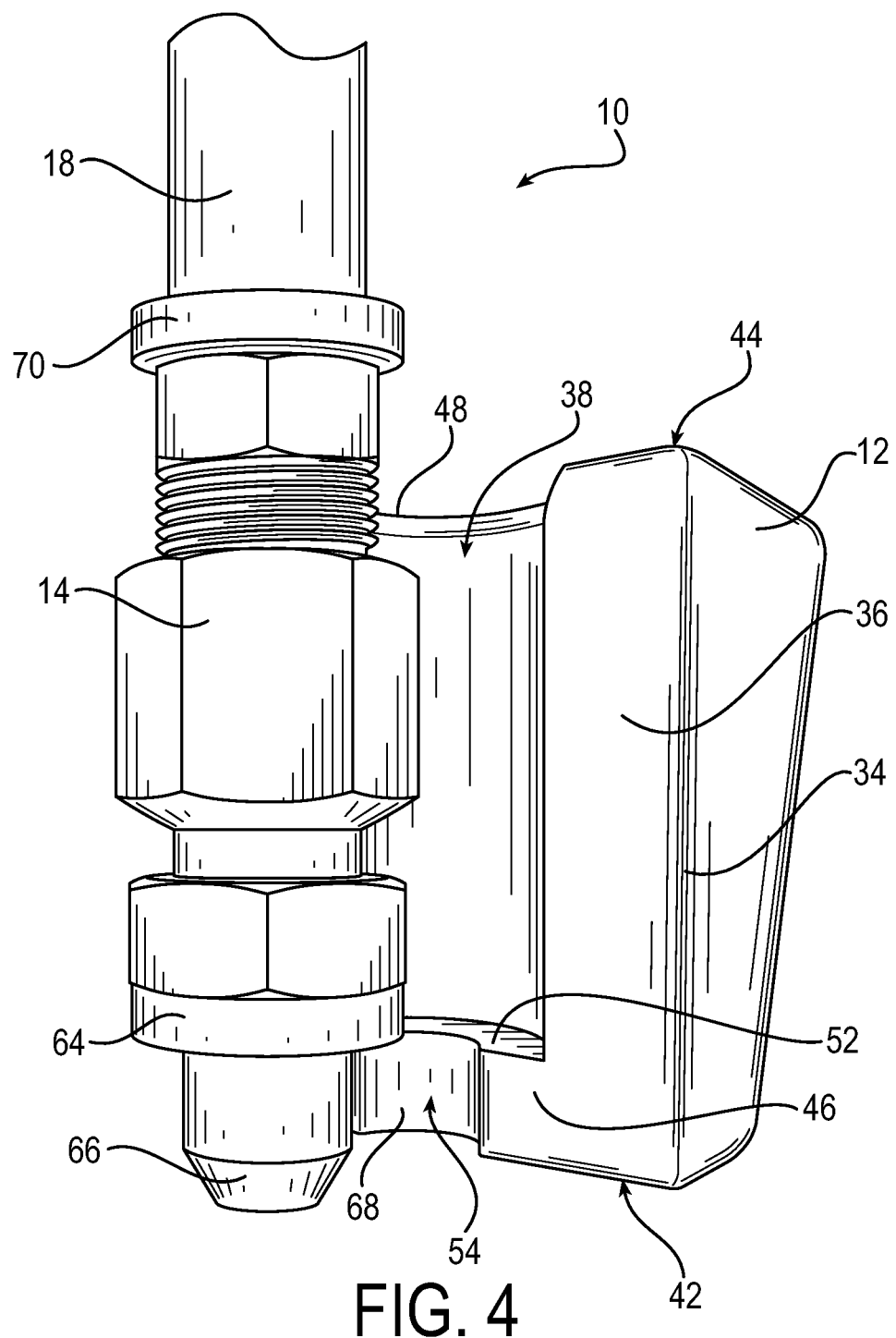
FIG. 4 is a schematic drawing showing the nozzle holder body and a spray nozzle of the spray dust suppression system shown in FIG. 1.
Figure 5:
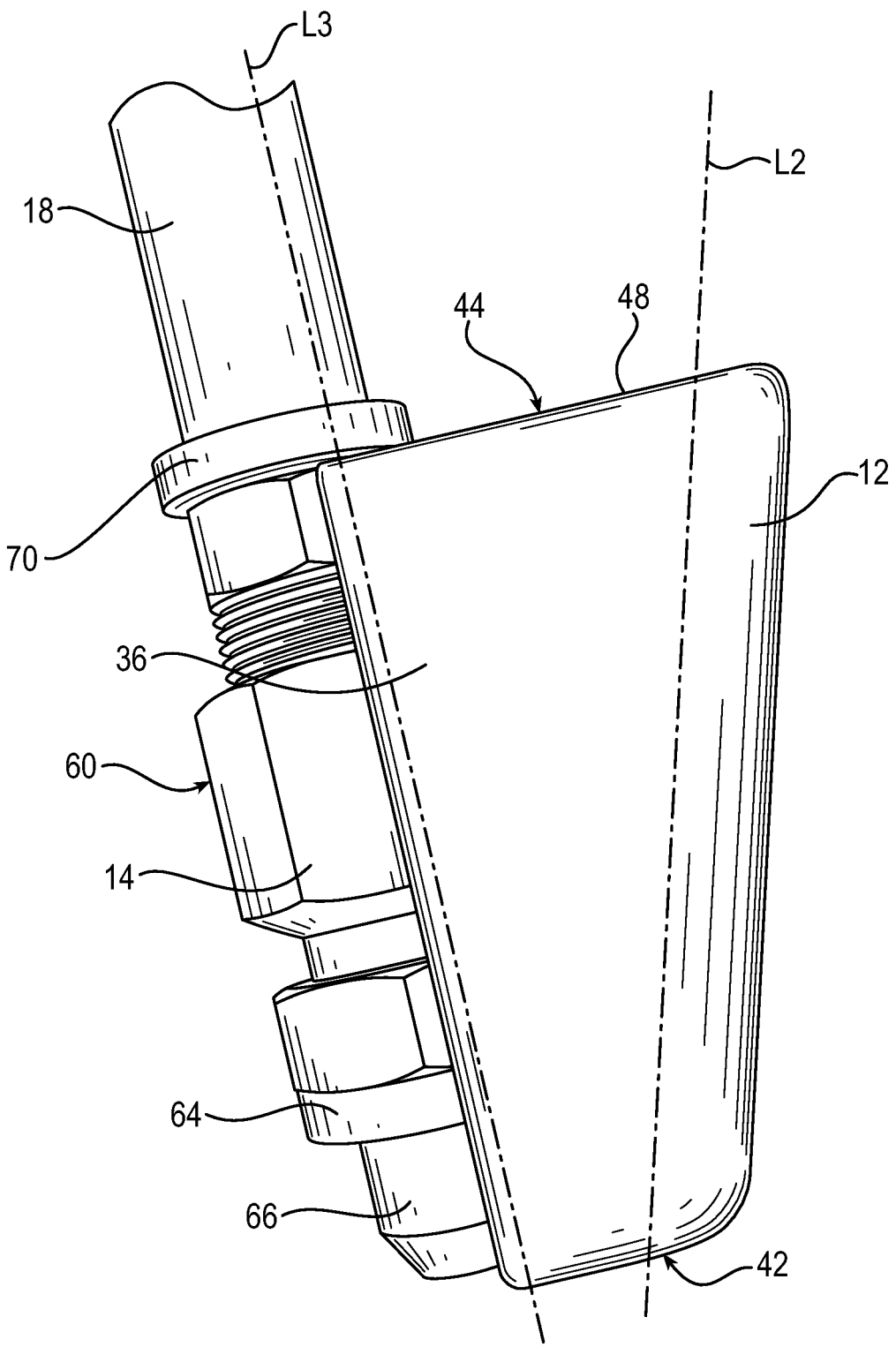
FIG. 5 is a schematic drawing showing a side view of the nozzle holder body and the spray nozzle of the spray dust suppression system shown in FIG. 1.

As shown in FIG. 3, a protruding body 34 protrudes radially outwardly from the second surface 32 relative to the longitudinal axis L2 of the arcuate wall 28. The protruding body 34 includes a concave or semi-cylindrical wall 36 and a pocket 38 defined therein. The pocket 38 receives the spray nozzle 14, as shown in FIGS. 1, 4 and 5. As shown in FIG. 3, the pocket 38 is semi-cylindrical in shape and is formed as a concave recess defining a longitudinal axis L3. The pocket 38 is open away from the percussive tool 16, and the semi-cylindrical wall 36 is curved to form the closed semi-cylindrical half of the pocket 38. The pocket 38 has a radius of curvature that is less than the radius of curvature of the arcuate wall 28. The pocket 38 extends longitudinally along most of the length of the entire nozzle holder body 12. The pocket 38 is angled inwardly toward the longitudinal axis L2 of the arcuate wall 28 such that the longitudinal axis L3 of the pocket 38 is angled relative to the longitudinal axes L2, L3 of the arcuate wall 28 and the percussive tool 16 when the holder body 12 is positioned against the main body 20. The pocket 38 may be angled between 0 degrees and 30 degrees relative to the longitudinal axis L2 of the arcuate wall 28. The angle may be fixed and predetermined. Other angles may also be suitable. As shown in FIG. 2, the nozzle holder body 12 may have a hollow cavity 40 that opposes the pocket 38 adjacent the semi-cylindrical wall 36 and is open to the first surface 30. The hollow cavity 40 is defined by the semi-cylindrical wall 36 and the pocket 38 may protrude into the hollow cavity 40.

The nozzle holder body 12 has a first end 42 and a second end 44 opposite the first end 42. The nozzle holder body 12 has a length that extends between the first end 42 and the second end 44. The arcuate wall 28 extends between the first end 42 and the second end 44. The protruding body 34 is angled inwardly toward the longitudinal axis L2 of the arcuate wall 28 from the second end 44 to the first end 42. The width of the semi-cylindrical wall 36 is tapered in the lengthwise direction from the second end 44 to the first end 42. As shown in FIGS. 2-4, the protruding body 34 has a radial wall 46 located at the first end 42 of the nozzle holder body 12. The protruding body 34 has an end surface 48 opposite the radial wall 46 at the second end 44 of the nozzle holder body 12. The end surface 48 is angled outwardly relative to the longitudinal axis L2 of the arcuate wall 28 from the second end 44 toward the first end 42 of the nozzle holder body 12. The semi-cylindrical wall 36 extends between the radial wall 46 and the end surface 48. The radial wall 46 forms a partially closed end of the pocket 38, and an opposite end of the pocket 38 is open adjacent the end surface 48.

As shown in FIGS. 3 and 4, the radial wall 46 has a radial surface 50 that may extend perpendicular relative to the longitudinal axis L2 of the arcuate wall 28, and a nozzle retaining surface 52 opposite the radial surface 50. The nozzle retaining surface 52 faces into the pocket 38 and is perpendicular to the semi-cylindrical wall 36. The outer radius of the nozzle retaining surface 52 is equivalent to the radius of the pocket 38. The radial wall 46 further defines a notch 54 that is semi-cylindrical in shape and extends through the radial wall 46 to the pocket 38. The notch 54 defines a longitudinal axis that is parallel to the longitudinal axis L3 of the pocket 38. The notch 54 has a radius that is smaller than the radius of the pocket 38.

Figure 6:
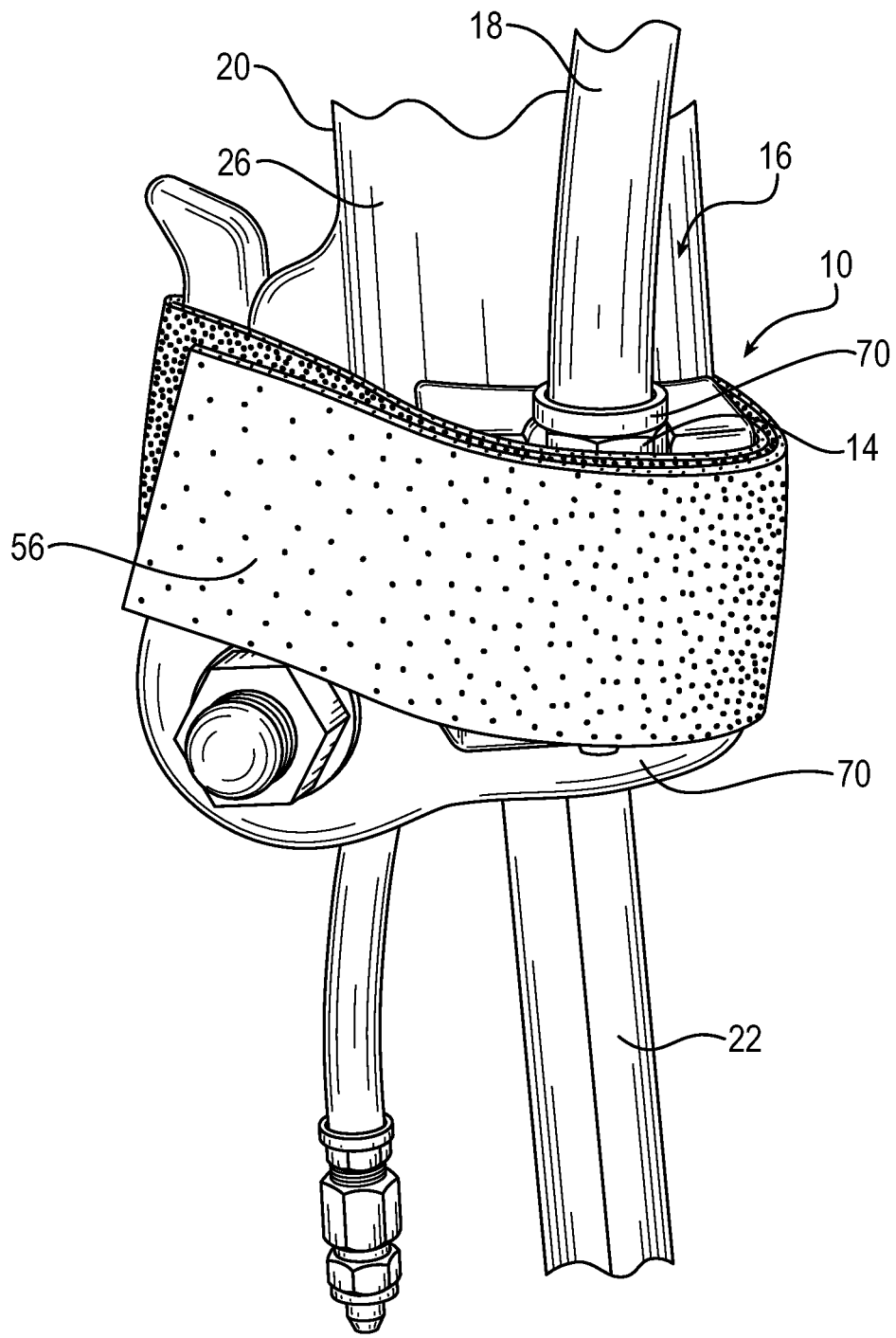
FIG. 6 is a schematic drawing showing an isometric view of the spray dust suppression system shown in FIG. 1 having a fastening strap.

With further reference to FIG. 6, the spray dust suppression system 10 includes the nozzle holder body 12, the spray nozzle 14, and at least one fastener 56 that is configured to both maintain the engagement between the nozzle holder body 12 and the exterior surface 26 of the percussive tool 16, and to hold the spray nozzle 14 within the nozzle holder body 12, such that the spray nozzle 14 is retained within the pocket 38 in the radial direction. Any suitable fastener may be used. The at least one fastener 56 may be a strap or other fastener that is detachable from the percussive tool 16 and from the nozzle holder body 12. In other exemplary embodiments, the at least one fastener 56 may be formed integrally with at least one of the percussive tool 16 or the nozzle holder body 12. In exemplary embodiments, the fastener may include magnets, clips, clamps, or epoxy glue. In still other exemplary embodiments, a combination of different fastener types may be used. The fastener may be formed of a material that is softer relative to the nozzle holder body 12, such as a rubber polymer material or thermoplastic material.

As shown in FIGS. 2 and 3, the nozzle holder body 12 has at least one longitudinal slot 58 that extends parallel to the longitudinal axis L2 of the arcuate wall 28 for accommodating the fastener 56. As shown in FIGS. 5 and 6, the fastener is a fastening strap 56 that is inserted through the longitudinal slot 58 such that the fastening strap 56 is wrapped around an exposed side 60 of the spray nozzle 14 when the spray nozzle 14 is received in the pocket 38. The exposed side 60 of the spray nozzle 14 opposes the side of the spray nozzle 14 that is received within the pocket 38. The at least one longitudinal slot 58 may include two longitudinal slots 58a, 58b that are arranged on each side of the pocket 38 such that the fastening strap 56 extends over the pocket 38. As shown in FIGS. 2 and 3, the longitudinal slots 58, 58a, 58b may extend along most of the length of the arcuate wall 28 and proximate a longitudinal edge 62 of the arcuate wall 28. The longitudinal slot 58, 58a, 58b is radially spaced from the protruding body 34.

The spray dust suppression system 10 further includes the spray nozzle 14 arranged on the end of the hose 18, as best shown in FIGS. 4 and 5. The hose 18 is fluidly connected to a fluid source that enables the hose 18 to supply fluid through the spray nozzle 14 and out of the tip end of the spray nozzle 14. The fluid source may be dependent on the application. For example, the fluid source may be a freestanding water tank, or a water source that is inherently present at a construction site. The spray nozzle 14 may be configured to spray a cone-shaped stream of fluid. Other spray patterns may also be suitable. In exemplary embodiments, the cone-shaped stream may be an 80-degree cone. The radius of the pocket 38 is selected to accommodate the largest radius of the spray nozzle 14 as the spray nozzle 14 may have varying dimensions along the length of the spray nozzle 14. The spray nozzle 14 may be press-fitted into the pocket 38. When assembled, the spray nozzle 14 is retained within the pocket 38, and the spray nozzle 14 and the pocket 38 are arranged along a longitudinal axis that is either shared with the pocket 38 or parallel to the longitudinal axis L3 of the pocket 38, as best shown in FIG. 5. Accordingly, the spray nozzle 14 is angled relative to the longitudinal axis L2 of the arcuate wall 28 and the longitudinal axis L1 of the percussive tool 16 at the same angle that the pocket 38 is angled relative to the longitudinal axis L2 of the arcuate wall 28.

The main body of the spray nozzle 14 has varying diameters along the spray nozzle 14. The varying diameters are used to engage against corresponding surfaces of the nozzle holder body 12 to secure the spray nozzle 14 within the nozzle holder body 12 in the axial direction. The spray nozzle 14 includes at least one protruding outer diameter 64 that is engageable against the nozzle retaining surface 52 of the radial wall 46. The protruding outer diameter 64 engages against the nozzle retaining surface 52 in the longitudinal direction. A tip end 66 of the spray nozzle 14 is adjacent the protruding outer diameter 64 along the longitudinal axis of the spray nozzle 14. The tip end 66 has a diameter that is less than the diameter of the notch 54 such that the tip end 66 engages against a semi-cylindrical wall 68 of the notch 54 and is received through the notch 54 in the axial direction.

As shown in FIGS. 4-6, the spray nozzle 14 further includes a ring member 70 arranged along the longitudinal axis of the spray nozzle 14 at an end of the spray nozzle 14 opposite the tip end 66. The ring member 70 has a larger diameter than the adjacent portion of the spray nozzle 14 such that the ring member 70 protrudes radially outwardly. The ring member 66 engages against the end surface 48 of the nozzle holder body 12 in the longitudinal direction. In alternative embodiments, the ring member 66 may be formed integrally with the spray nozzle 14 or the ring member 66 may be formed to be separable from the spray nozzle 14.

The engagement between the ring member 70 and the end surface 48 of the nozzle holder body 12, and the engagement between the protruding outer diameter 64 and the nozzle retaining surface 52 of the nozzle holder body 12 retains the spray nozzle 14 in the nozzle holder body 12 in the axial direction and prevents axial movement of the spray nozzle 14 relative to the nozzle holder body 12. The fastening strap 56, or any other suitable fastener, is used to hold the spray nozzle 14 in the nozzle holder body 12 in the radial direction. With reference to FIGS. 1 and 6, the percussive tool 16 has a radially protruding lip 68 at the bottom end of the main body 20 of the percussive tool 16 from which the tool bit 22 extends. The radially protruding lip 68 has a larger diameter relative to the main body 20 such that the radially protruding lip 68 is engageable against the radial surface 50 (shown in FIGS. 2 and 3) of the nozzle holder body 12 in the axial direction. Accordingly, the nozzle holder body 12 is prevented from axially sliding downwardly and off of the main body 20 of the percussive tool 16 by contact with the protruding lip 68.

The nozzle holder body and the spray dust suppression system is advantageous by fixing the angle at which the nozzle provides constant spray to the area in which the percussive tool is operating. The angle is predetermined by the pocket formed in the nozzle holder body. The engagement of the surfaces of the nozzle holder body with the spray nozzle and the main body of the percussive tool prevents axial movement of the spray nozzle, and the hose attached to the spray nozzle, relative to the percussive tool. The fastener is provided to hold the spray nozzle in the nozzle holder body and prevent radial movement of the spray nozzle and the hose relative to the percussive tool.

A nozzle holder is used to affix a spray nozzle to a percussive tool. The nozzle holder includes an arcuate wall having a first surface engageable around the percussive tool, and a second surface opposing the first surface, a protruding body that protrudes radially outwardly from the second surface relative to a longitudinal axis of the arcuate wall, and a concave recess that is formed in the protruding body and receives the spray nozzle, wherein the concave recess is angled inwardly toward the longitudinal axis of the arcuate wall.

The nozzle holder has a first end and a second end, the arcuate wall extends between the first end and the second end, and the protruding body is angled inwardly toward the longitudinal axis from the second end toward the first end.

The protruding body has a radial wall located at the first end of the nozzle holder, an end surface opposite the radial wall at the second end of the nozzle holder, and a semi-cylindrical wall that extends axially between the radial wall and the end surface.

The radial wall has a radial surface that extends perpendicularly relative to the longitudinal axis, and the end surface is angled outwardly from the longitudinal axis toward the first end of the nozzle holder.

The radial wall has a nozzle retaining surface that opposes the radial surface and defines a first end of the concave recess, and the nozzle retaining surface is perpendicular to the semi-cylindrical wall.

The radial wall defines a notch that has a smaller radius relative to a radius of the concave recess.

The nozzle holder is detachable from the percussive tool.

The nozzle holder is formed of a rubber polymer material or thermoplastic material.

The nozzle holder includes a plurality of longitudinal slots that extend parallel to the longitudinal axis and are configured to receive a fastener therethrough.

The protruding body has a concave wall that defines the concave recess, and a hollow cavity that opposes the concave wall and is open to the first surface of the arcuate wall.

The concave recess is angled between 0 degrees and 30 degrees.

A spray dust suppression system is used for a percussive tool having a first longitudinal axis, and the spray dust suppression system includes a nozzle holder body having an arcuate surface that engages around an exterior surface of the percussive tool, and a pocket opposing the arcuate surface that receives a spray nozzle, wherein the pocket is angled inwardly relative to a longitudinal axis of the arcuate surface. The spray dust suppression system includes at least one fastener that is configured to both maintain engagement between the nozzle holder body and the exterior surface of the percussive tool, and retain the spray nozzle within the pocket.

The pocket has a concave recess that opens in a direction opposing the arcuate surface.

The nozzle holder body and the at least one fastener are detachable from the percussive tool.

The at least one fastener is a strap and the nozzle holder body defines a plurality of slots through which the strap is received.

The plurality of slots includes a first slot arranged adjacent a first side of the pocket and a second slot arranged adjacent a second side of the pocket opposite the first side, wherein when assembled, the strap extends over the pocket.

The spray dust compression system may include a spray nozzle, and the spray nozzle being configured to spray a cone-shaped stream of fluid.

The spray nozzle is press-fitted in the pocket.

The nozzle holder body has a radial wall at an end of the pocket and an open end opposite the radial wall, and the spray nozzle has a radial surface that engages against the radial wall in the longitudinal direction.

The spray dust suppression system includes a ring member arranged adjacent the spray nozzle and opposite the radial surface of the spray nozzle, and the ring member engages against the nozzle holder body in the longitudinal direction.

The radial wall defines a notch having a radius that is less than a radius of the pocket, and the spray nozzle has a tip end received by the notch.

The radial wall has a nozzle retaining surface that is engageable with the radial surface of the spray nozzle, and an end surface that opposes the nozzle retaining surface and is engageable with a corresponding radially protruding surface of the percussive tool.

The spray dust suppression system may further include a hose connected to the spray nozzle.

The concave recess is angled between 0 degrees and 30 degrees

The nozzle holder body is formed of a rubber polymer material or thermoplastic material.

A method of affixing a spray nozzle to a percussive tool includes engaging an arcuate surface of a nozzle holder against an exterior surface of the percussive tool, press-fitting a spray nozzle into a pocket of the nozzle holder, wherein a first longitudinal axis of the pocket is angled relative to a second longitudinal axis of the percussive tool, and using a fastener to secure the nozzle holder to the percussive tool and hold the spray nozzle in the pocket.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A nozzle holder for affixing a spray nozzle to a percussive tool, the nozzle holder comprising:
   an arcuate wall having a first arcuate surface engageable around the percussive tool, and a second arcuate surface opposing the first arcuate surface;
   a protruding body that protrudes radially outwardly from the second arcuate surface relative to a longitudinal axis of the arcuate wall; and
   a concave recess that is formed in the protruding body and receives the spray nozzle, wherein the concave recess is angled inwardly toward the longitudinal axis of the arcuate wall;
   wherein the protruding body has a concave wall that defines the concave recess, and a hollow cavity that opposes the concave wall and is open to the first surface of the arcuate wall.

2. The nozzle holder according to claim 1, wherein the nozzle holder has a first end and a second end, the arcuate wall extends between the first end and the second end, and the protruding body is angled inwardly toward the longitudinal axis from the second end toward the first end.

3. The nozzle holder according to claim 2, wherein the protruding body has a radial wall located at the first end of the nozzle holder, an end surface opposite the radial wall at the second end of the nozzle holder, and a semi-cylindrical wall that extends axially between the radial wall and the end surface.

4. The nozzle holder according to claim 3, wherein the radial wall has a radial surface that extends perpendicularly relative to the longitudinal axis, and the end surface is angled outwardly from the longitudinal axis toward the first end of the nozzle holder, wherein the radial wall has a nozzle retaining surface that opposes the radial surface and defines a first end of the concave recess, the nozzle retaining surface being perpendicular to the semi-cylindrical wall.

5. The nozzle holder according to claim 3, wherein the radial wall defines a notch that has a smaller radius relative to a radius of the concave recess.

6. The nozzle holder according to claim 1, wherein the nozzle holder is detachable from the percussive tool.

7. The nozzle holder according to claim 1, wherein the nozzle holder is formed of a rubber polymer material or thermoplastic material.

8. The nozzle holder according to claim 1 further comprising a plurality of longitudinal slots that extend parallel to the longitudinal axis and are configured to receive a fastener therethrough.

9. The nozzle holder according to claim 1, wherein the concave recess is angled between 0 degrees and 30 degrees.

10. A spray dust suppression system for a percussive tool having a first longitudinal axis, the spray dust suppression system comprising:
    a spray nozzle;
    a nozzle holder body having an arcuate surface that engages around an exterior surface of the percussive tool, and a pocket opposing the arcuate surface that receives the spray nozzle, wherein the pocket is angled inwardly relative to a longitudinal axis of the arcuate surface; and
    at least one fastener that is configured to both maintain engagement between the nozzle holder body and the exterior surface of the percussive tool, and retain the spray nozzle within the pocket;
    the spray nozzle being configured to spray a cone-shaped stream of fluid, wherein the spray nozzle is press-fitted in the pocket;

wherein the nozzle holder body has a radial wall at an end of the pocket and an open end opposite the radial wall, and the spray nozzle has a radial surface that engages against the radial wall in the longitudinal direction; and wherein the radial wall defines a notch having a radius that is less than a radius of the pocket, and the spray nozzle has a tip end received by the notch, and wherein the radial wall has a nozzle retaining surface that is engagable with the radial surface of the spray nozzle, and an end surface that opposes the nozzle retaining surface and is engageable with a corresponding radially protruding surface of the percussive tool.

11. The spray dust suppression system according to claim 10, wherein the pocket has a concave recess that opens in a direction opposing the arcuate surface.

12. The spray dust suppression system according to claim 10, wherein the nozzle holder body and the at least one fastener are detachable from the percussive tool.

13. The spray dust suppression system according to claim 10, wherein the at least one fastener is a strap and the nozzle holder body defines a plurality of slots through which the strap is received, wherein the plurality of slots includes a first slot arranged adjacent a first side of the pocket and a second slot arranged adjacent a second side of the pocket opposite the first side, and wherein when assembled, the strap extends over the pocket.

14. The spray dust suppression system according to claim 10, further comprising:
a ring member arranged adjacent the spray nozzle and opposite the radial surface of the spray nozzle, the ring member engaging against the nozzle holder body in the longitudinal direction; and
a hose connected to the spray nozzle.

15. The spray dust suppression system according to claim 10, wherein the concave recess is angled between 0 degrees and 30 degrees, and wherein the nozzle holder body is formed of a rubber polymer material or thermoplastic material.

16. A nozzle holder for affixing a spray nozzle to a percussive tool, the nozzle holder comprising:
an arcuate wall having a first arcuate surface engageable around the percussive tool, and a second arcuate surface opposing the first arcuate surface;
a protruding body that protrudes radially outwardly from the second arcuate surface relative to a longitudinal axis of the arcuate wall; and
a concave recess that is formed in the protruding body and receives the spray nozzle, wherein the concave recess is angled inwardly toward the longitudinal axis of the arcuate wall;
wherein the nozzle holder has a first end and a second end, the arcuate wall extends between the first end and the second end, and the protruding body is angled inwardly toward the longitudinal axis from the second end toward the first end;
wherein the protruding body has a radial wall located at the first end of the nozzle holder, an end surface opposite the radial wall at the second end of the nozzle holder, and a semi-cylindrical wall that extends axially between the radial wall and the end surface; and
wherein the radial wall has a radial surface that extends perpendicularly relative to the longitudinal axis, and the end surface is angled outwardly from the longitudinal axis toward the first end of the nozzle holder, wherein the radial wall has a nozzle retaining surface that opposes the radial surface and defines a first end of the concave recess, the nozzle retaining surface being perpendicular to the semi-cylindrical wall.

* * * * *